INVENTORS
JOHN EVERHART
J. LAWSON FELDER

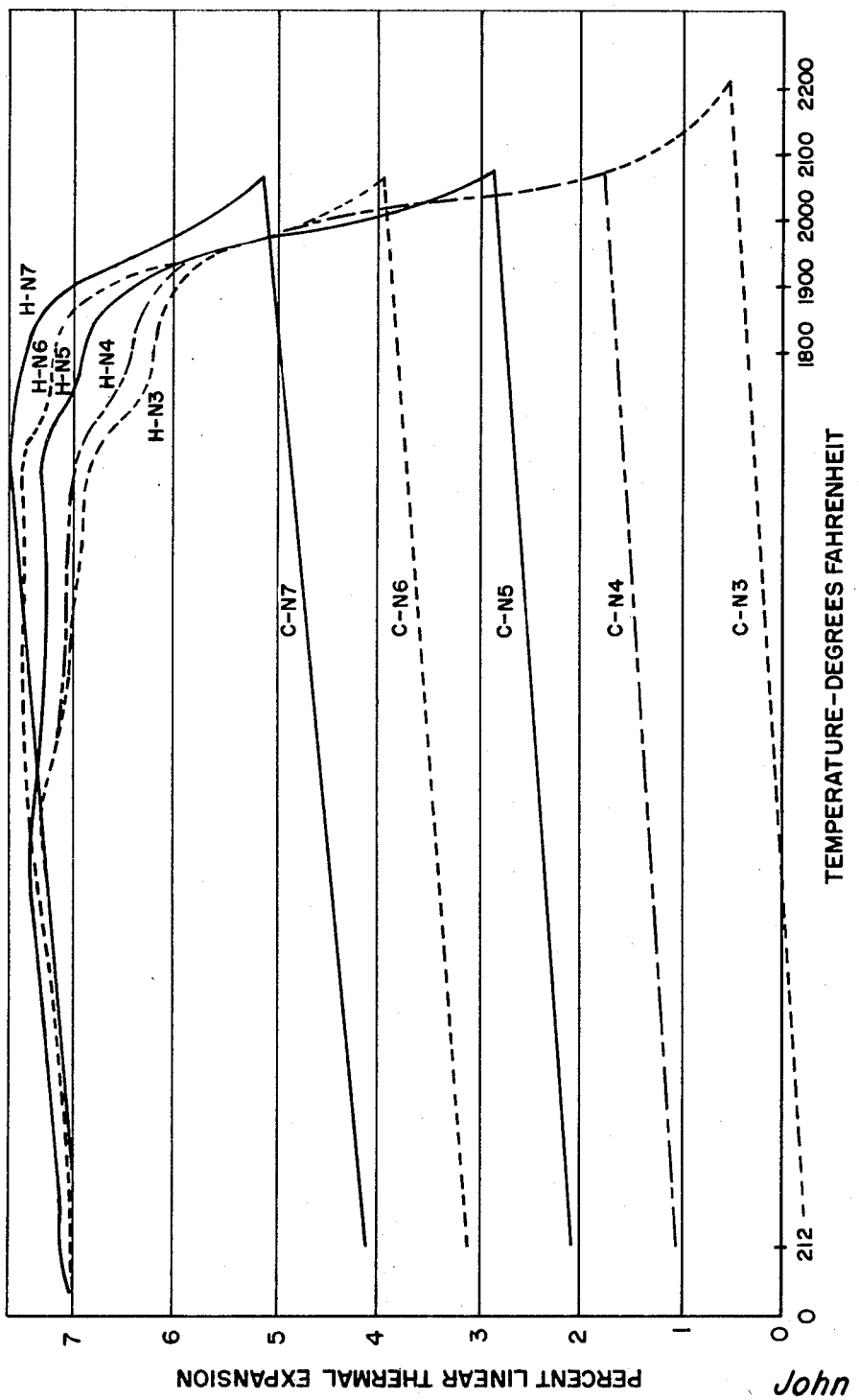

United States Patent Office 3,651,184
Patented Mar. 21, 1972

3,651,184
PROCESS FOR FAST-FIRE CERAMIC TILE USING NEPHELINE SYENITE AND CLAY
John Everhart and John Lawson Felder, San Antonio, Tex., assignors to Thiokol Chemical Corporation, Bristol, Pa.
Continuation-in-part of application Ser. No. 5,618, Jan. 26, 1970. This application May 18, 1970, Ser. No. 38,370
Int. Cl. C04b 33/00, 33/24, 33/32
U.S. Cl. 264—56       4 Claims

ABSTRACT OF THE DISCLOSURE

Composition and process for manufacturing fast-fire ceramic tile, particularly large-sized floor and wall tiles of ¼" to 1' x 12" x 12" dimensions or larger, comprise a system in which the function usually performed by the clay ingredient, as the plasticizer and binder in the fired ware in usual ceramic-forming compositions, is performed instead by a fusible material, nepheline syenite, which serves also as the grog ingredient in the pre-fired stages, and in which system the clay, reversely, performs the usual skeleton-forming function of the grog in the fired ware. The tile body making composition consists essentially by weight of 20 to 80% of nepheline syenite and from 80 to 20% of a clay whose incipient fusion point is substantially above that of the nepheline syenite and which contains less than 15%, and preferably less than 5%, by weight of free quartz. The composition is essential for making semi-vitreous, non-glazed or glazed, tile products unusually free of structural defects, such as cracking, warpage and poor dimensional uniformity, by means of a novel fast-fire process in which the tiles are fired in the temperature range of about 1800 to 2200° F. from their greenware state to matured, fired products in from about one to three hours.

This application is a continuation-in-part of United States patent application of J. Lawson Felder and John E. Funnel, S.N. 5,618, filed Jan. 26, 1970.

BACKGROUND OF THE INVENTION

Field of the invention

This invention relates to compositions and a method for forming ceramic tile products from naturally occurring mineral raw materials. More particularly, it relates to a method for converting low grade nepheline syenite waste product with argillaceous raw materials into high quality ceramic wares. Especially, it relates to novel compositions and to a process for manufacturing continuously relatively thin, large dimensioned, flat, glazed or non-glazed ceramic tiles, useful as floor or ornamental wall tiles.

Description of the prior art

It is well known that ceramic structural elements, such as building blocks, tiles, and sewer pipe, can be formed by various methods from argillaceous raw materials existing in nature. For example, one of the oldest processes for making bricks from argillaceous, clay-like, materials is to add water to the pulverized raw materials, form the ware, dry it and then fire it.

As a further example, a number of improved methods are known for making fired products from argillaceous materials by adding pre-fired argillaceous materials having a relatively high fusion point to a raw argillaceous material and a fluxing material, each having a relatively lower fusion point than the pre-fired material, before the water used for plasticizing purposes is added. Such procedure is a common expedient used to obtain a skeleton of the stable higher fusing material in the raw product, thereby, first, to reduce cracking and warping of the raw product during drying to remove water, and second, to reduce dimensional instability both during drying and then firing of the product to its permanent form.

The methods used in the prior art for reducing raw product damage during drying and to reduce dimensional instability during firing depend on the additions of minor amounts of such stable material in the form of inert, pre-fired, non-plastic argillaceous materials, called grogs, to the primary argillaceous binding and plasticizing body materials of the ceramic-forming compositions. The grog material, having been prefired to a stable product, acts as a rigid skeleton in the body of the product. It remains practically unchanged in physical state, with minimum physical and thermo-chemical reactions taking place within the grog during drying and firing of the greenware product.

In contrast to the high fusing grogs of the prior art, the grog of the present invention is a low fusing grog. Accordingly, as used in the description of the present invention, the term "low fusing grog" means material in a thermochemically stable state, whether naturally occurring in such state, or pre-fired to such state, essentially having an incipient fusion point below that of the clay ingredient in a ceramic ware forming composition.

In prior art, the proportions of raw argillaceous material, hereinafter referred to as clay, to the grog of the prior art in a structural product, may vary widely. It is recognized that almost every proportion of clay to such grog has been used in the prior art in making ceramic structural building products. It is further recognized that the purpose of the clay in the prior art formulations is for improving workability of the tile forming composition and for increasing the greenware strength, and, further as a glass-contributing binder for cementing the fired product into a usable mass.

In the usual tile manufacturing processes, the shrinkage during drying may be about 2% to 8% and the further shrinkage during firing may be about 2% to 6%. Sufficient skeletal material must therefore be present to minimize the overall shrinkage of 4 to 14%. When relatively large-sized, thin slabs of greenware are made, such as ¼" to 1" x 12" x 12" or larger, the prior art grog, or skeletal, content must be increased to improve the dimensional stability and the clay, or binder, content must accordingly be proportionately reduced. The amount of clay available for binding the grog skeleton then may be insufficient to adequately bind the grog, and, consequently, cracking and warpage may occur. The present invention is directed to overcoming such difficulties while permitting large-sized, thin tile product to be dried and fired with minimum damage, adequate structural strength, and improved dimensional stability.

The maturing of a tile product in a kiln depends on well known time-temperature relationships. If firing time is reduced, the temperature at which the tile matures must be raised to compensate for the shorter firing time. In the older prior art, typical processes and apparatuses which have been used for firing tile products require a firing time of 24 or more hours, or even 80 hours as taught, for example, in U.S. 3,230,283. Processes and kilns in which the firing time is appreciably less then 24 hours may be referred to as "fast-fire." Specifically, as used in the description of the present invention and in the claims hereof, the term "fast-fire" means that the firing time of the 1/4" to 1" thick tile at kiln temperature from greenware to fired product is in the range of about one to three hours, depending on the thickness of the tile product.

A fast-fire process for manufacture of ceramic tiles is disclosed and claimed in Ser. No. 5,618, supra, which is incorporated herein by reference. A fast-fire process for manufacture of vitreous china is taught also in U.S. 3,501,321. The process of Ser. No. 5,618, as does the process of the present invention, depends upon the use of a low fusing grog for its practice. The process of U.S. 3,501,321, depends upon the use of nepheline syenite and a siliceous flux in the ceramic body forming composition and in the glaze. The present invention depends upon the use of nepheline syenite as the low fusing grog in the process of Ser. No. 5,618 in the absence of an added siliceous fluxing material such as is taught in U.S. 3,501,321.

The present invention is directed further to overcoming a gassing problem which may occur during firing while permitting large sized, thin tile product to be fast-fired and fast-cooled without damage to the body or surface and with retention of adequate structural strength whether the tile is in non-glazed or glazed form. A common problem is firing tile body compositions, especially at elevated maturing temperatures and at reduced firing times, is the formation and evolution of gases which arise from the clay content of the tile. The rate of temperature rise during firing may be such that the volume of gases evolved from the clay and from the organic and mineral impurities associated with the clay in the tile body are so great that the gases may not have sufficient time to pass out through the open pores of the body. In such event, the gases may bloat, pock-mark and otherwise disrupt the surface appearance and the form of the tile body. If, in order to minimize this disruption, the clay content of the body is reduced, and the prior art type grog content is raised proportionately, there may not be enough clay material present to provide the bonding and plasticizing capability required for a strong, sound tile product.

Prior art approaches to minimizing the disruption caused by gassing during firing are to pre-fire some of the ingredients of the body composition as taught, for example, by Bender, U.S. 2,159,349, or as taught by Howard B. Cummings and Ralph Gibson in Ser. No. 150,724, 872 O.G. 1403, to mix all the ingredients together and to pre-fire them above the temperature at which the cast ceramic articles having the same composition would normally be sintered, or fired, and then grinding and screening the fired composition for use in the casting composition which then is dried and again fired.

Another problem arising during the fast-firing of tiles of elevated maturing temperatures and reduced firing and cooling times is the damage due to thermal shock caused by the presence of an excessive amount of free quartz in the tile body composition. Many clays contain free quartz. Additionally, some clay minerals form free quartz by thermo-chemical reactions during firing. Quartz is a low temperature mineral form of silica ($SiO_2$). When quartz is heated to about 1063° F., it undergoes a substantial change in volume. It expands on heating and contracts on cooling as it passes between its alpha and beta forms. (The faster the firing rate, the more abrupt is the change in volume of the quartz.) Mechanical stress failure of the tile body consequently may result during such firing. The present invention is directed also to overcoming this quartz-content caused difficulty by the utilization of nepheline syenite as a specific quartz-reacting, low fusing grog material. It advantageously effectively utilizes nepheline syenite to eliminate substantially all free quartz that is present in the clay ingredient used in tile body compositions of the invention.

Nepheline syenite is a well-known igneous rock, somewhat resembling granite in texture, hardness, and general appearance. The chief minerals comprising this rock are nepheline, potash feldspar, and soda feldspar, with various accessory minerals. Nepheline syenite, as mined, contains little or no free quartz. The mineral nepheline is higher in alkali and alumina, and lower in silica than are potash and soda feldspars. Consequently, when this feldspathoid is present in the igneous rock, the analysis of the rock as a whole is higher in alumina and alkalies and lower in silica than that of other igneous rocks that do not contain nepheline. The mineral nepheline, instead of soda feldspar, crystallizes from the magma as a result of an insufficient amount of silica to form feldspar. The fact that it is silica-poor and reactive with free silica, e.g. quartz, enhances its vitrifying, or fluxing, activity in ceramic bodies.

Several decades of research and subsequent commerical utilization of nepheline syenite have shown not only that nepheline syenite can be used as substiute for feldspar as a fluxing agent for ceramic ware but further that it is superior to feldspar for use in ceramics in many respects.

Nepheline syenites occur extensively in Canada, Russia and India. In the United States, deposits of nepheline syenite are located at Pulaski County, Ark.; Beemersville, Sussex County, N.J.; Red Hill, N.H., Virginia; and Montana. The undesirable accessory minerals in the latter deposits do not, however, lend themselves to economic extraction by present day purification processes. Some excellent deposits of syenite are located at Blue Mountain, Methuen Township, Ontario, and in the vicinity of Bancroft, Ontario, Canada. The Bancroft deposits are higher in nepheline content than the former but have not previously been considered sufficiently uniform for commercial utilization. The Blue Mountain deposit (Lakefield nepheline syenite) contains a large amount of high quality rock of great uniformity. The commercially avialable tonnages in various locations run to many millions of tons, much of which is in the form of fine waste screenings. The present invention is especially adopted for the use of such waste screenings without further processing.

Compositions comprising nepheline syenite and clays have heretofore been used to make ceramic wares, e.g. floor and wall tiles of 1/4" x 4 1/4" x 4 1/4" size, by slow-fire processes. Such compositions are taught for example, by C. J. Koenig, in J. Can. Ceram. Soc. 16, 17–25 (1947) and in the articles referred to therein. The present invention makes use of nepheline syenite-clay compositions which are similar to those of Koenig, but which are essentially low in free quartz content, in a fast-fire process.

SUMMARY OF THE INVENTION

The present invention is directed to overcoming the disadvantages resulting from fast-firing ceramic-body-forming compositions cast in the form of large-sized, thin, flat tiles. It provides a means by which large-sized tile can be manufactured in a fast firing process requiring only about 1 to 3 hours at title maturing kiln temperature as compared to existing slow-fire processes requiring many more hours of firing. According to the invention, a ceramic-body-forming composition suitable for attaining the desired objective is prepared by admixing by weight (a) from about 20 to 80% of a low fusing grog, nepheline syenite, essentially having an incipient sintering, or fusion, point in the range from about 1,800° F. to 2,200° F., (b) from about 20 to 80% of clay essentially haivng an incipient fusion point at least about 200° F. above that of the nepheline syenite and a free quartz content of less than about 15% by weight, and (c) an amount of water adequate for plasticizing the composition for extrusion through a die. Nepheline syenite having a densification, or surface coalescing point, in the range from about 1,900° F. to 2,100° F. is most preferred for practice of the invention. The incipient fusion point of the clay preferably is above about 2,600° F., but may be slightly lower, provided that the fusion point of the clay is essentially several hundred degrees, e.g. 200 to 600° F., higher than that of the nepheline syenite ingredient in the composition. The free quartz content of the clay is preferably not more than about 5% by weight, e.g. such as the quartz content of clay mined in the southwest areas of the United States.

To prepare the composition, fine particles of clay are homogeneously mixed in a solids blender in a known way with fine particles of the nepheline syenite. The the mixture is plasticized with a plasticizing amount of water, e.g. 10 to 30%, based on weight of dry mix and sufficient to make the mass extrudable through a die. It is then formed into greenware by conventional means, preferably by extrusion through a "stiff-mud" extrusion press and then cutting by tile-stamping dies or by plastic pressing. The shaped tiles are pre-dried to greenware tiles by drying for about 24 hours in a hot air oven at about 300° F. When glazed tiles are to be made as the product, the dried greenware tiles are then treated on one surface with a glazing composition. The tiles next are placed flat on pedestals on a continuous conveyor belt and fed directly into and through a fast-fire kiln maintained at a temperature sufficient to heat the tiles to a tile maturing temperature of about 1800–2200° F. or higher, until mature. Upon leaving the kiln, the tiles are permitted to cool rapidly to room temperature. The firing time of the greenware tile of the present invention at the tile maturing temperature is in the range of about one to three hours, depending on the thickness of the tile and its composition.

During firing of the greenware, the nepheline syenite in the tile body making composition is heated to its softening temperature, and combines intimately and interacts with the clay. The clay, because of its higher fusion temperature, does not fuse but provides a refractory skeleton which prevents the maturing tile from sagging or warping.

The composition and process of the present invention are particularly useful for manufacture of ceramic tiles having dimensions of about 1/4" to 1" x 12" x 12". Such sized tiles have become popular for architectural applications both as floor tile and as ornamental ceramic wall tiles. This large size permits more economical installations showing fewer mortar joints than smaller sized tiles. Larger sizes of flat thin tile may also be made and fired according to the invention, the size being limited only by the size of the kiln.

The 12" x 12" dimensions of the thin tile are comparatively large in the conventional tile forming art, particularly for continuous manufacturing processes. Tile of this large size when made with previously used tile body making compositions is more susceptible to dimensional instability and to warping, sagging, and cracking during manufacture than is the tile when made with the compositions of this invention. One reason for this is that during fast-firing of a prior art tile-forming composition which contains a large quantity of clay, the tile body is subjected to disruptive forces caused by the gas evolution resulting from the thermochemical reactions occurring in the clay. By substitution of nepheline syenite for a portion of the clay content, the gas evolution problem is reduced. In the fast-firing of a tile-forming composition which contains a large quantity of clay, the tile body is subjected also to thermal shock from the inversion volume changes of free quartz occurring in, and liberated from, the clay. By substitution of nepheline syenite for clay content, the thermal shock problem is virtually eliminated both during heating and cooling, thereby permitting application of the novel fast-firing process of this invention. The nepheline syenite is a naturally formed igneous rock material that had been formed in the earth at temperatures comparable to pre-firing temperatures used for making grog, i.e. at temperatures at which the gas-forming tendencies of the components of the rock have been reduced to levels acceptable for practice of this invention. Also, the nepheline syenite is not only devoid of free quartz, it is silica-starved, and will combine in stoichiometric amounts with a moderate amount of free quartz present in the clay ingredient in the tile body making composition. The thermal shock problem arising from the inversion volume change of free-quartz thus, too, is virtually eliminated by substituting nepheline syenite grog for clay content. The composition of the present invention, therefore, has the additional advantages in that gas-forming content of the mixture and the free quartz content of the mixture has been minimized by using a minimum of clay content and avoiding the addition of free quartz materials, such as, flint or free silica, which are added as flux materials in the prior art slow firing processes and in the fast fire china ware process of U.S. 3,501,321, supra.

BRIEF DESCRIPTION OF THE DRAWING

The process used in manufacturing ceramic tile is illustrated schematically in FIG. 1 of the drawing. A typical glazed tile is illustrated in FIG. 2. In FIGS. 2 and 3, the tile body 2 is shown glazed with an ornamental ceramic glaze 3.

FIG. 4 shows the relationship between temperature and percent of linear thermal expansion of nepheline syenite-clay compositions containing from 30 to 70% of nepheline syenite as measured both during the firing stages H–30 through H–70 and during the cooling stages C–30 through C–70.

DESCRIPTION OF PREFERRED EMBODIMENTS

Figure 2:
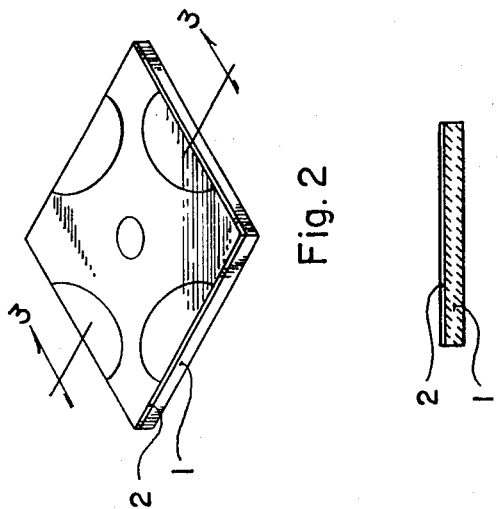

The invention and its practice may be more fully understood from the following description and examples.

As discussed above, the essence of the present invention is the use in a title-forming ceramic composition of a nepheline syenite grog ingredient which essentially will fuse sufficiently during the fast-firing of the composition so that the nepheline syenite, rather than the clay ingredient, serves as the glassy binder of the product, and the use of a clay ingredient which does not fuse at the maturing temperature and is low in free quartz content. Simultaneously, the relatively low fusion point of the nepheline syenite permits firing of greenware tile at a reasonably low temperature in order to minimize heat loads and cooling loads of the manufacturing process. Further, the composition used permits use of a conventional fast-firing temperature for maturing structural ceramic products, e.g. in the range of about 1,800° F. to 2,200° F., at which the clay does not soften, melt or fuse at the maturing temperature, thereby avoiding sagging. On the other hand, the nepheline syenite is able to quick-melt to form a glassy bond for internally binding the crystalline phases of the finished tile.

Nepheline syenites which have been found useful for the practice of the invention are shown in Table I. The Canadian nepheline syenite composition listed in Table I represents the purest such mineral that is known to be commercially available in North America; it amply satisfies the prerequisites for use in this invention. The Arkansas nepheline syenite composition listed in Table I represents an impure mineral material that is preferred for use in this invention as it contains larger amounts of desirable accessory minerals, supplying iron oxide, CaO, MgO and $TiO_2$, all of which lower the fusing temperature of the nepheline syenite. Additionally, the latter nepheline syenite material is largely a waste product which is available in great quantities. The color of the tile product body, due principally to the large $Fe_2O_3$ content of Arkansas material, is not objectionable. It has been found that the addition of minor amounts of accessory non-siliceous fluxing minerals, supplying e.g. 1 to 15% by weight of $TiO_2$, CaO, MgO, or $Fe_2O_3$, to nepheline syenite does not impair the required function of nepheline syenite within the preferred embodiments of this invention.

As discussed above, nepheline syenite serves as a non-plastic grog in the raw product body. It has been found that the use of this grog in the tile body proportionately reduces the clay content required in the tile body and thereby substantially reduces drying, shrinkage and warpage during the drying and firing of ¼" to 1" x 12" x 12" flat tiles. In the tile manufacturing operation, it is preferred to use from about 55% to 80% of Arkansas nepheline syenite shown in Table I, by weight, mixed with from about 45 to 20% of a clay, respectively, shown as clay No. 1 in Table II.

During fast-firing of a tile body containing 20 to 80% of nepheline syenite, and proportionately 80 to 20% clay, it has been found that the nepheline syenite does not evolve gases that, if present, would bloat and tile body. Also, due to the reduction in clay content of the body, use of nepheline syenite causes a reduction in the total volume of gases evolved from the clay. The small volume of gases which do form escape from the body during the early heating period in the fast-fire kiln, thereby preventing bloating of the fused tile composition as it matures.

Further, during fast-firing of a tile body containing 20 to 80% of nepheline syenite, it has been found that the nepheline syenite quick-fuses in the 1,800 to 2,200° F. range of maturing temperature to form a very viscous glassy bond, in conjunction with the 80 to 20% skeletal clay content of the tile body, to permit the partially vitreous tile body of ¼" to 1" x 12" x 12" size to be supported in a flat, i.e. horizontal, position on refractory pegs extending up from the deck of a continuously travel-refractory pallet in a fast-fire kiln, or on rolls in a roller hearth kiln without occurrence of objectional sagging or warpage. The need for sagger plates, or other expensive kiln furniture is thereby minimized.

TABLE I.—NEPHELINE SYENITE ANALYSES

| | Nepheline syenite (parts by weight) | |
|---|---|---|
| | Canadian | Arkansas |
| $SiO_2$ | 60.7 | 60.3 |
| $Al_2O_3$ | 23.3 | 19.9 |
| $Fe_2O_3$ | 0.07 | 4.6 |
| CaO | 0.7 | 1.2 |
| MgO | 0.1 | 1.2 |
| $Na_2O$ | 9.8 | 6.2 |
| $K_2O$ | 4.6 | 5.3 |
| $TiO_2$ | | 1.1 |
| loss on ignition | 0.7 | 0.2 |

TABLE II.—CLAY ANALYSES

| Clay | Parts by weight | | | |
|---|---|---|---|---|
| | No. 1 | No. 2 | No. 3 | No. 4 |
| $SiO_2$ | 53.60 | 53.96 | 45.8 | 58.10 |
| $Al_2O_3$ | 31.40 | 29.34 | 38.8 | 23.11 |
| $Fe_2O_3$ | 0.80 | 0.99 | 0.7 | 1.73 |
| CaO | 0.40 | 0.37 | Trace | 0.79 |
| MgO | 0.30 | 0.30 | | 1.01 |
| $Na_2O$ | 0.05 | 0.12 | Trace | 0.34 |
| $K_2O$ | 0.10 | 0.28 | | 1.90 |
| $TiO_2$ | 1.20 | 1.64 | 1.4 | 1.40 |
| $H_2O$ | | 12.82 | 13.6 | 10.22 |
| MnO | 0.01 | 0.02 | | 0.01 |
| $P_2O_5$ | | 0.15 | | 0.17 |
| $SO_3$ | | 0.03 | | 0.03 |

No. 1—Texas ball clay, Troop, Tex.
No. 2—Tennessee ball clay.
No. 3—Georgia sedimentary clay.
No. 4—Ohio plastic fire clay, Lawrence, Ohio.

The use of fast-firing to mature a large, flat structural ceramic product requires the substantial absence of free quartz in the product body, to prevent mechanical stress damage to the body by quartz inversion volume change during the overall rapid rate of temperature rise and fall through about 1063° F. in the fast-fire kiln. It has been found that 20 to 80% of nepheline syenite, mixed with 80 to 20% of one or more of the low quartz content clays shown in Table II in a tile body composition, gives fast-firing results that indicate the tile body to be virtually free of quartz inversion volume change effect. For example, in FIG. 4 are shown charted the results obtained during firings and coolings of compositions having from 70 to 30 parts by weight of Arkansas nepheline-syenite having a composition as shown in Table I in admixture with from 30 to 70 parts by weight, respectively, of a clay having a composition shown as clay No. 1 in Table II. The results charted were obtained by preparing and firing water-plasticized nepheline syenite-clay mixtures having the following body compositions:

| | Composition, percent by weight | |
|---|---|---|
| Body | Nepheline syenite | Clay |
| N7 | 70 | 30 |
| N6 | 60 | 40 |
| N5 | 50 | 50 |
| N4 | 40 | 60 |
| N3 | 30 | 70 |

The dry materials were blended in a Simpson mixer. Sifficient water was added, with continued mixing, to form an extrudable plastic mass. Test specimens were extruded under 25 inches of vacuum. The specimens were heated and cooled in an Orton Dilatometer at a rate of 275° F. per hour. The percents of linear thermal expansion were recorded at intervals of about 100° C. Heating was continued until over-firing temperatures were reached, as was evidenced by a rapid contraction of the specimen due to fusion of the clay skeleton as well as of the nepheline syenite grog in the specimen body. The body in each case was then progressively cooled to ambient room temperature. The heating and cooling temperatures and linear changes in each case were traced continuously onto a recording chart. FIG. 4 represents a composite of the traces of the five charts so prepared.

In FIG. 4, the effects of the presence of varying amounts of nepheline syenite in the tile body making composition is clearly shown both in the heating traces (H) and in the cooling traces (C). The heating traces show that linear thermal expansion is greatest for a high clay body composition, e.g. H–N3, and least for a high nepheline syenite body composition, e.g. H–N7. The cooling traces show, for each specimen, C–N3 through C–N7, that no disruption is present in the cooling traces such as would be caused if free quartz were present and were passing from a beta to an alpha form during cooling and thus be resulting in internal stresses which could rupture the specimen. The smoothness of each cooling trace is indicative of the fact that inter-action between nepheline syenite and any free quartz in the clay has been completed by firing to the 2000–2200° F. temperatures.

The smoothness of the cooling traces C–N3 through C–N7 is significant in that it verifies that the body compositions N3–N7 can be fired and cooled rapidly without rupturing the bodies and that, therefore, the compositions are especially suitable for a fast-fire process for making large-sized thin tiles free of warpage and cracks.

Other data obtained for the bodies N3–N7 are shown in Table III. The demonstrated percent shrinkage on cooling and the rate of thermal contraction in inches per linear inch of body per ° C. are particularly advantageous properties to have in the tile body when glazing is to be applied to the tile for ornamental or wearing purposes. As is well-known, when a heated, glazed ceramic body shrinks more than the glaze on its surface, the glaze will be under compression when cooled and usually will not craze. The use of compositions such as these described in connection with bodies N3 to N7 herein are especially advantageous for this purpose. Composition N6, consisting essentially by weight of about 60 percent nepheline syenite and 40 percent clay, is especially preferred for making the body of glazed ¼″ to 1″ x 12″ x 12″ tiles for fast-firing according to the invention.

TABLE III.—PHYSICAL PROPERTIES OF NEPHELINE SYENITE-CLAY CERAMIC BODIES

| Body | Diameter, inches | Load, lbs. | Length, inches | Modulus of rupture, p.s.i. | | Percent linear shrinkage | |
|---|---|---|---|---|---|---|---|
| | | | | Dried (300° F.) | Fired (2,025° F.) | Dried | Total after firing |
| N7 | 0.754 | 28.72 | 2.0 | 341 | 2,384 | 0.27 | 1.58 |
| N6 | 0.746 | 40.35 | 2.0 | 496 | 3,358 | 1.32 | 3.31 |
| N5 | 0.738 | 52.90 | 2.0 | 669 | 5,231 | 2.51 | 6.35 |
| N4 | 0.732 | 63.00 | 2.0 | 815 | 7,998 | 3.17 | 9.38 |
| N3 | 0.727 | 64.85 | 2.0 | 941 | 8,762 | 3.84 | 11.37 |

Further, it has been found that the tile product of the invention has unexpected properties in that it can be completely re-fired several times in the same fast-fire kiln, with or without glaze, without damage to the structural strength of the tiles. This novel property of the tile permits glazing of tile to obtain artistic effects with different colors and to reglaze defectively glazed tile.

Still further, nepheline syenite does not undergo any damaging disassociation or inversion reactions during heating and cooling in the fast-fire kiln. It contains minimal amounts of accessory minerals that require oxygen and time for oxidation, such as carbonaceous matter, calcite and pyrite that are objectionable materials.

Clays which have been found to be useful for the practice of this invention are shown in Table II. Each of the listed clays has a fusion temperature at least several hundred degrees above that of the nepheline syenite. It is important that the clays do not fuse below about 200 degrees Fahrenheit above that of the incipient fusion temperature of nepheline syenite so that the clay content of the tile body can form the skeletal material, in association with the fusing nepheline syenite, to maintain dimensional stability of the tile during fast-firing. Preferably, the mineral content of clays used in practicing the invention should be more kaolinitic and illitic than montmorillonitic. The color of the clay is not significant except when an unglazed tile is to be made. In such cases, one skilled in the art can select an appropriate color to suit his needs. The gassing activity of the clay, on firing, should preferably be as low as possible, because in the fast-firing process of the invention, gassing is undesirable and excessive gassing could cause the tile to bloat or explode, as discussed above.

It has been found that the use of from about 80% to 20% by wight of tile composition of clays shown in Table II satisfies the requisite for use in this invention, with 40% to 30% being preferred.

In the tile manufacturing operation, it is also advantageous and preferred to use 40% by weight of the clay No. 1 shown in Table II, mixed with 60% of the Arkansas nepheline syenite shown in Table I, particularly in compositions for making a ¼″ to 1″ x 12″ x 12″ tile body.

Use in the tile composition of 80% to 20% of a clay of Table II by weight, mixed with 20% to 80% nepheline syenite provides acceptable forming, acceptable drying without warpage or damage, acceptable greenware strength for handling and acceptable fast-firing with dimensional stability, and excellent structural strength. The clays of Table II basically are kaolinitic and contain less than 15% by weight of free quartz. Dissociation reactions and formation of gases during fast-firing are found to be acceptable.

Figure 1:
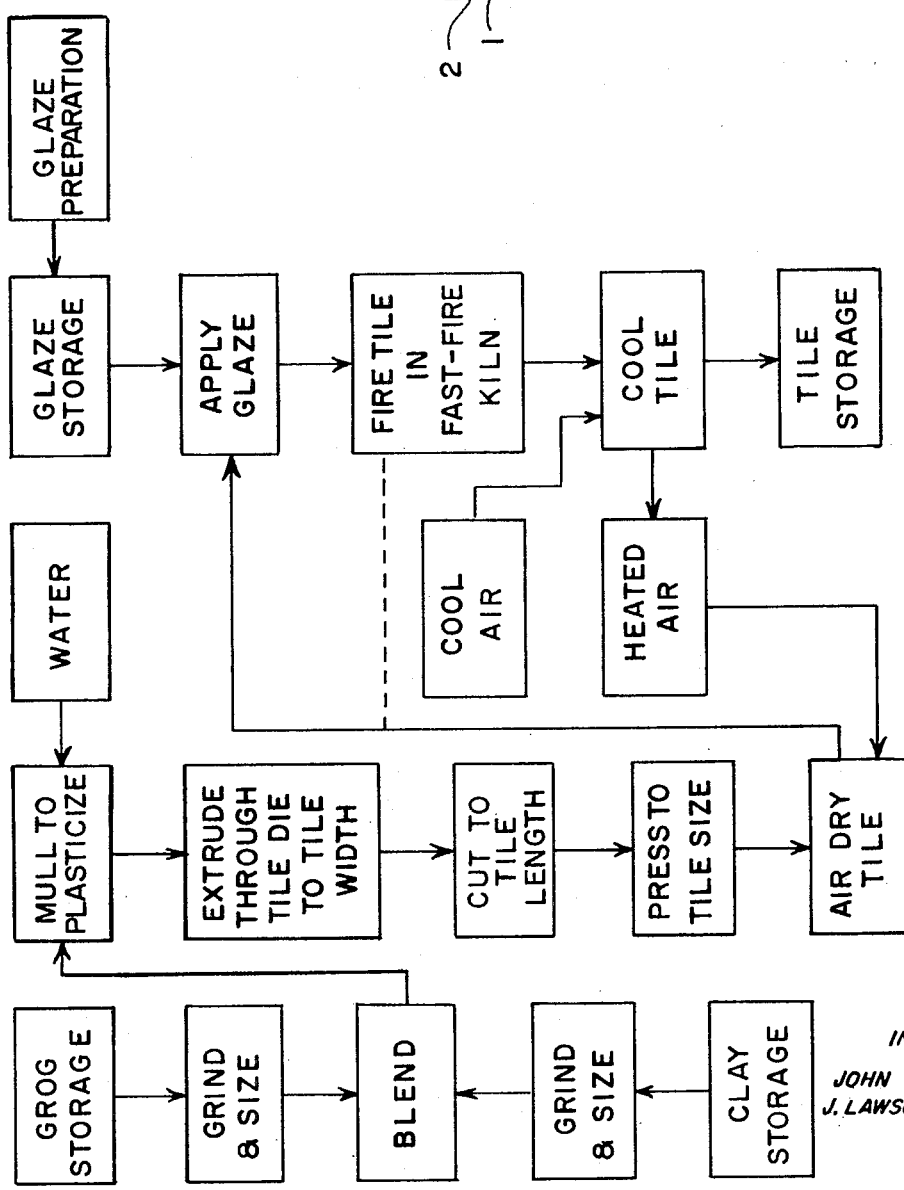

The process of the invention may be understood with reference to FIG. 1 of the drawing. Nepheline syenite, as described above, is ground and preferably screened to 100% passing a 28 mesh (Tyler series) (opening 0.0232 inch, 590 microns). Clay as described above, is ground, if necessary, and screened to 100% passing a 30 mesh screen and 25% to 50% passing a 100 mesh screen. The screen sizes are not critical to the practice of the invention, except that the particles should be fine enough to give a smooth bodied and surfaced tile product. Components of the tiles are ground and screened coarser for specific effects. In the preferred embodiments, the nepheline syenite and the clay are thoroughly mixed in a ratio, by weight, of 60 parts of nepheline syenite to 40 parts of clay. The mixture is placed in a pugmill and sufficient water is added in a known way to plasticize the mass for extrusion purposes. In an alternate procedure, if the tile is to be formed by dry press instead of extrusion, about half as much water or less is added to the mixing mill. In the preferred process of FIG. 1, the plasticized mass is de-aired and extruded in de-aired form through a die having the height and width of about that of the finished tile plus oversize allowance to compensate for drying and firing shrinkage. The tile is then cut to desired length. It is then placed in a sizing press where it is given a substantially hand-molded effect by appropriate design of the mold in the press. The pressing stage may be omitted in order to obtain desired textural and dimensional effects. The formed tile is then heated and dried in an oven up to about 300° F. to remove the water. If the title is to be provided with a glaze, the glaze composition is applied to the warm dry tile enroute to the fast-fire kiln. An alternate procedure for glazing a tile is to fast-fire the dry tile without a glaze composition and later to apply raw glaze to the fired tile and to fire the tile for the second time in the fast-fire kiln. In the kiln, which is preferably a precisely controlled gas-fired tunnel unit, the warm dry tile is rapidly heated on a continuously moving feed line to the maximum firing temperature necessary to mature the ware, e.g. about 1,800° F. to 2,200° F. The tiles going through the kiln may be supported on refractory pedestals in a known manner so that both the top and the bottom of each tile receives the required heat. In this manner, tiles fire evenly without sagging or warping. Because of the previously mentioned properties of nepheline syenite, the thin tiles, e.g. ¼″ to 1″ x 12″ x 12″, fire quickly and evenly, producing a superior tile product as compared to a similar tile made by the same operating steps but using clay as the binder and a flux material in the manner of the prior art.

Figure 3:
In FIG. 3 is illustrated a cross-section of the tile taken through the line 3—3 of FIG. 2.

A finished tile made according to the invention is shown in FIGS. 2 and 3. As shown in FIG. 2, the tile may be provided with an ornamental design which may be fitted to match similar designs in companion tiles either on the floor or on a wall application in a known way.

In addition to the above disclosed embodiments of the invention, extensive tests were conducted using nepheline syenite and various clays mixed in all proportions. Using producton equipment, it was found that a composition consisting of 20% nepheline syenite mixed with 80% plastic kaolinitic clay represents the lower limit in the range of nepheline syenite containing compositions which can be advantageously used for the fast-fire process of the invention, and that a composition consisting of 80% nepheline syenite mixed with 20% plastic kaolinitic clay represents the upper limit.

Glazes for use on ceramic wall and floor tile are well-known and many of such glazes may be used to glaze the tile body of the invention. Glazes which have melting points close to those of the tile body of the invention preferably are used. Representative glazes are listed in Table IV.

TABLE IV

| Glaze composition | Percent by weight | | | |
|---|---|---|---|---|
| | I | II | III | IV |
| Nepheline syenite | 55 | 60 | 16 | |
| Glazing frite * | | | | 55 |
| Florida kaolin | 15 | | | |
| Feldspar | | | | 10 |
| Tennessee ball clay | 20 | 13 | 29 | 7.0 |
| Flint | 10 | | | |
| Talc (Loomis tremoline) | | 25 | 36 | |
| Bentonite | | 2 | | |
| Zinc oxide | | | | 7.5 |
| Zirconium opacifier | | | | 18.0 |
| Gum arabic | | | | 1.5 |

*Frits #11 and 27 (5 to 1 ratio by weight) O. Hommell Co., Pittsburgh, Pa.

A series of fast-fire tests were carired out on ¼" x 12" x 12' ceramic tiles formed as described above with a tile body making composition consisting essentially of 60% Arkansas nepheline syenite and 40% Texas ball clay plasticized with sufficient water for extrusion purposes. The greenwire tiles were sprayed with glaze IV of Table IV. The tiles were fired in a continuously moving conveyor line of a gas-fired tunnel dryer and attained the physical properties as shown in Table VI.

While the disclosed embodiments of the invention represent preferred practice of the invention, it is to be understood that the invention is not limited to their precise forms and that various changes and modifications may be made by those skilled in the art without departing from the scope of the invention.

TABLE VI

| Tile body No | 1 | 2 | 3 |
|---|---|---|---|
| Kiln temperature, °F | 1,950 | 2,000 | 2,150 |
| Time in kiln (min.) | 60 | 60 | 60 |
| Cooling time (min.) | 10 | 10 | 10 |
| Physical properties: | | | |
| Modulus of rupture, p.s.i. | 3,160 | 3,358 | 3,845 |
| Total linear shrinkage, percent | 3.31 | 3.5 | 3.8 |
| Ink stain resistance | Penetrates | (¹) | (¹) |
| Water absorption, percent | 8.7 | 4.7 | 2.5 |
| Appearance: | | | |
| Warpage | Nil | Nil | Nil |
| Pitting | (²) | None | None |
| Cracks in glaze | Some | None | None |
| Flaking of glaze | None | None | None |

¹ No pentration.
² Very slight.

What is claimed:

1. A fast-fire process for making a flat, structural ceramic tile which comprises:
   forming a flat tile article from a water-containing, plasticized ceramic body making composition consisting essentially by dry weight of from about twenty to eighty percent of particulated nepheline syenite as the binder ingredient, said nepheline syenite selected from the group consisting of Canadian and Arkansas nepheline syenite of Table I herein above set forth in this specification, and from eighty to twenty percent of particulated clay, said clay selected from the group consisting of numbers 1, 2, 3 and 4 of Table II herein above set forth in this specification and having a free quartz content of less than about five percent by weight as a skeleton-forming ingredient;
   placing the dried greenware tile article on supporting means in a ceramic-ware firing kiln preheated to and maintained at a temperature in the range of 1800° to 2200° F. for maturing said greenware article;
   heating the greenware tile article in the kiln for a period of time ranging from sixty minutes to about a hundred and eighty minutes to mature said tile article; and,
   cooling the matured tile article to ambient room temperature to make a flat tile article.

2. The process according to claim 1 which comprises applying a ceramic glaze composition to the dried greenware article before it is placed in the heated kiln.

3. The process according to claim 1 which comprises applying a ceramic glaze composition to the matured article after cooling the article and then refiring the ceramic article in said heated kiln.

4. The process according to claim 1 wherein said ceramic composition consists essentially of about 55 to 80% of nepheline syenite and 45 to 20% of kaolinitic clay by dry weight.

References Cited

UNITED STATES PATENTS

| | | | |
|---|---|---|---|
| 3,501,321 | 3/1970 | Margola | 106—46 |
| 2,910,760 | 11/1959 | Jackson | 264—62 |
| 3,351,687 | 11/1967 | Thome et al. | 264—66 |
| 3,520,705 | 7/1970 | Shido et al. | 106—46 |
| 3,533,812 | 10/1970 | Cumming et al. | 106—46 |
| 2,974,387 | 4/1958 | Tomkins | 264—56 |
| 3,271,487 | 3/1961 | Tomkins | 25—142 |
| 3,510,324 | 11/1965 | Cummings et al. | 106—39 |
| 3,585,056 | 6/1971 | Bush | 106—46 |
| 3,553,063 | 1/1971 | Megles | 106—39 |
| 3,539,387 | 11/1970 | Kelly et al. | 264—62 |

OTHER REFERENCES

C. J. Koenig, "Use of Nepheline Syenite in Floor-Tile and Wall-Tile Bodies," March, 1940, Journal of the American Ceramic Society, at 86–91.

C. J. Koenig, "Influence of Particle-Size Distribution on Properties of Nepheline Syenite," July 1955, J.A.C.S. at 236–241.

Dr. C. J. Koenig, "Developments Regarding Nepheline Syenite in Ceramics," Jour. Can. Cer. Soc. [16], 1947, at 17–25.

JULIUS FROME, Primary Examiner

J. H. MILLER, Assistant Examiner

U.S. Cl. X.R.

106—39, 45; 264—57, 66